H. STOCKHEIM.

Assignor to S. & F. UHLMANN.

FILTER.

No. 10,891. Reissued Dec. 27, 1887.

WITNESSES

Edwin L. Yewell,

Ezell A. Dick

INVENTOR

Heinrich Stockheim by Marcellus Bailey

Attorney

UNITED STATES PATENT OFFICE.

HEINRICH STOCKHEIM, OF MANNHEIM, BADEN, GERMANY, ASSIGNOR TO SIMON UHLMANN AND FREDERICK UHLMANN, OF NEW YORK, N. Y.

FILTER.

SPECIFICATION forming part of Reissued Letters Patent No. 10,891, dated December 27, 1887.

Original No. 363,619, dated May 17, 1887. Application for reissue filed October 20, 1887. Serial No. 252,932.

*To all whom it may concern:*

Be it known that I, HEINRICH STOCKHEIM, of Mannheim, in the Empire of Germany, have made an invention of certain new and useful Improvements in Filters; and I do hereby declare that the following, in connection with the accompanying drawings, is a full, clear, and exact description and specification of the same.

The invention relates to the filtration of liquids; and it consists of certain combinations of mechanism by means of which the operation of the filter is insured, and the compression of the filtering material is facilitated.

The invention consists of certain combinations of mechanical devices, which are set forth in detail in the claims at the close of this specification, more or less of which may be used in the same filter or filtering apparatus, as found expedient.

The filtering apparatus in which my invention is embodied may be of quadrangular, cylindrical, round, or other suitable form; and in order that my invention may be fully understood I have represented in the accompanying drawings and will proceed to describe a filtering apparatus of cylindrical form embodying all my new combinations.

Figure 2:
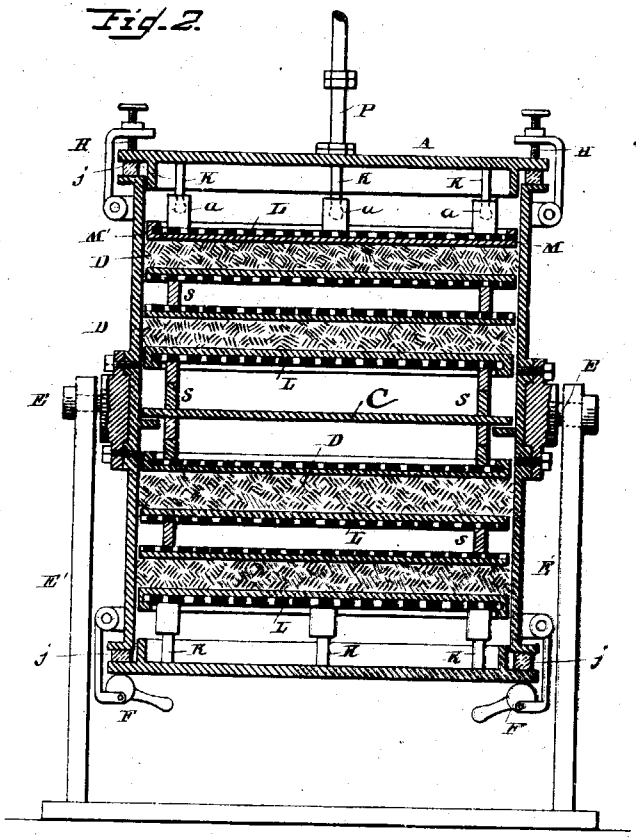
Figure 1:
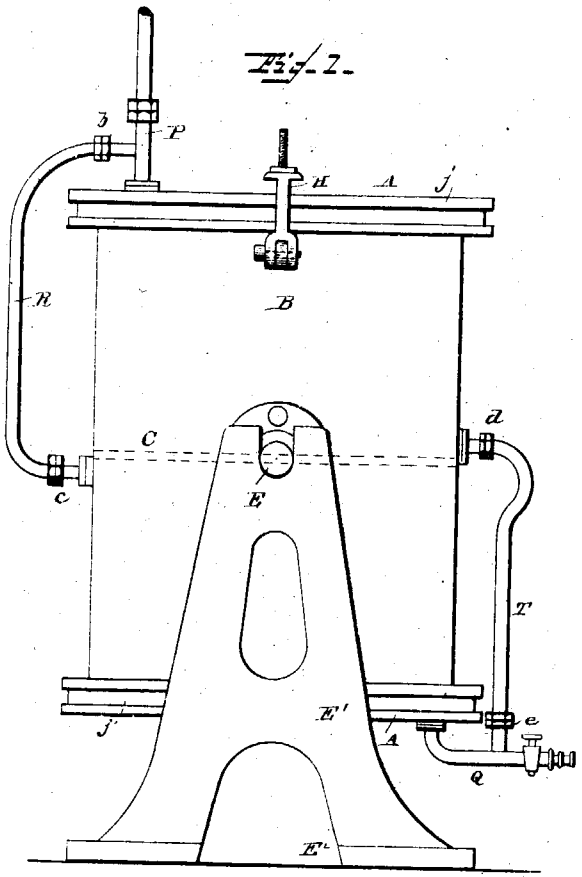

Figure 1 of said drawings is a side elevation of the said filtering apparatus. Fig. 2 represents a central axial section of the same.

The body B of the said filter is cylindrical, and is provided at its middle with trunnions E, which are mounted on suitable standards, E', attached to a base-plate, E², the said standards and base-plate constituting a portable supporting-frame, by means of which the filter may be moved and upon which the filter may be tipped, for the purpose of facilitating the removal and replacement of the filtering material. The said filter-body B is provided with a central partition, C, which divides the said body into two compartments, each of which may be used for filtering a liquid separately from the other. In each of the said compartments two masses of filtering material, D D, are arranged, the filtering material being supported between perforated plates L, the outer one of which confines the filtering material. These masses of filtering material are kept separate from each other by supports S, placed between the supporting-plates.

The body of the filter is closed by two covers, A A, which are held to the said body and may be pressed upon the apparatus by means of either screws, H, Fig. 2, or by means of eccentrics F, Fig. 2, and for the purpose of producing a tight joint between each cover and the body of the filter an india-rubber ring, *j*, is inserted between the cover and the said body.

In order that no liquid shall pass between the filtering material and the interior wall of the body of the filter, and thus escape filtration, the upper and lower perforated plates, L, are fitted on their peripheries with rubber rings M, which are in close contact with the inner side of the body B. These rubber rings M are provided with grooves in their sides to receive the rims of the perforated plates. In order that pressure may be exerted upon the filtering material (for tightening the same) by the operation of securing the covers in place, each cover A closing the end of a compartment is provided with studs or projections K, the number of which corresponds with the size of the apparatus, and which project inward from the inner face of the cover and intervene between it and the perforated plates, so that when the cover is pressed inward by means of the screws or eccentrics these studs transmit the pressure to the filtering material. The ends of the studs are fitted with rubber blocks *a*, which prevent the ends of the studs from indenting or bruising the perforated plates to which the pressure is applied.

In order that the liquid may be supplied to the filtering-compartments and may be delivered from them, the covers A A are fitted with pipes P Q, respectively, having junctions *b e*, respectively, and branch pipes R T, the branch pipe R connecting the supply-pipe P with the entry-chamber of the lower filtering-compartment and the branch pipe T connecting the discharge-chamber of the upper filtering-compartment with the main discharge-pipe Q.

The operation is as follows: The receptacle B may be given a half-revolution on its trunnions E, so as to move the lower compartment to the top and the upper compartment to the bottom, if desired. If both compartments are to be used conjointly for filtering, the pipe-connections R and T, with the pipes P and Q, remain as shown in the drawings in Fig. 1, so that the liquid to be filtered flows into the pipe P and into the upper compartment, and at the same time, through the branch pipe R and the junction *c*, into the lower compartment. The liquid which enters the upper compartment flows downward through the filtering materials D and, through the junction *d*, into the branch pipe T, and the liquid which enters the lower compartment flows through the filtering materials D downward and into the pipe Q, so that the two filtered liquids pass into the same pipe, Q.

If two different liquids are to be filtered, the connecting-pipes R and T are removed and the junctions *b* and *e* are closed by caps screwed over them, while the junction *d* of the upper compartment is provided with a discharge-pipe and the junction *c* of the lower compartment is provided with an admission-pipe. One liquid now enters through the pipe P on the upper cover A into the upper compartment and flows off, after being filtered, through the junction *d* of the said compartment, while the other liquid enters through the junction *c* of the lower compartment, and after having passed through the filtering materials flows off through the tube Q on the lower cover A. In this manner two different liquids—for instance, white wine and red wine—can be simultaneously filtered in the same apparatus.

The apparatus itself, with the exception of the filtering materials, may be made of any suitable material—such as wood or metal, or both together—and can also be made of any size and shape.

Having thus fully described a filtering apparatus embodying my invention, what I claim as new is—

1. The combination, with the body of the filtering apparatus, perforated plates between which the filtering material is placed, and packing-rings at the edges of said plates, of a removable cover for said body, a yielding or compressible packing-ring between said cover and body, studs attached to the inside of the cover and removable therewith for bearing upon perforated plate, and a device for pressing the cover inward, as and for the purposes hereinbefore set forth.

2. The combination, substantially as before set forth, of the body of the filter divided into two compartments, the inlet and discharge junctions for each compartment, the perforated plates which sustain the filtering material and inclose the same, so as to prevent its movement in any direction whatever be the position of the body of the filter, the portable supporting-frame, and the trunnions which permit the filter to be tipped upon said supporting-frame.

3. In a filter, the combination of a receptacle divided into two compartments by a central partition, of the filtering bodies placed above each other, and of perforated plates with two covers provided with studs or projections covered with rubber blocks, and with a device for pressing the covers inward, so that the latter exert a simultaneous pressure upon the said filtering bodies, substantially as herein shown and described.

4. In a filter, the receptacle B, the central partition, C, the supports S, the filtering bodies D, and the perforated plates L, provided with rubber rings M, in combination with the covers A, provided with the projections or studs K, the rubber blocks *a*, the rubber rings *j*, and a device for pressing the cover A inward, substantially as herein shown and described.

Signed at New York, in the county of New York and State of New York, this 7th day of October, A. D. 1887.

HEINRICH STOCKHEIM.

Witnesses:

WALTER H. CRITTENDEN,
F. HAMMATT NORTON.